(12) United States Patent
Park et al.

(10) Patent No.: US 9,268,066 B2
(45) Date of Patent: Feb. 23, 2016

(54) COMPLEX PRISM SHEET

(71) Applicant: KOLON INDUSTRIES, INC., Gwacheon-si, Gyeonggi-do (KR)

(72) Inventors: Chang Won Park, Yongin-si (KR); Chang Pyo Hong, Yongin-si (KR); Kyung Jong Kim, Yongin-si (KR); Tae Kyung Kim, Yongin-si (KR); Eui Young Shin, Seongnam-si (KR); Hong Gu Hwang, Incheon (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 0 days.

(21) Appl. No.: 14/369,614

(22) PCT Filed: Dec. 6, 2012

(86) PCT No.: PCT/KR2012/010541
§ 371 (c)(1),
(2) Date: Jun. 27, 2014

(87) PCT Pub. No.: WO2013/100425
PCT Pub. Date: Jul. 4, 2013

(65) Prior Publication Data
US 2015/0055326 A1    Feb. 26, 2015

(30) Foreign Application Priority Data

Dec. 30, 2011  (KR) .................. 10-2011-0147910
Nov. 19, 2012  (KR) .................. 10-2012-0130672

(51) Int. Cl.
*G02B 1/10*     (2015.01)
*G02F 1/1335*   (2006.01)
*F21V 5/00*     (2015.01)
*G02B 5/04*     (2006.01)
*G02B 5/02*     (2006.01)
(Continued)

(52) U.S. Cl.
CPC . *G02B 1/105* (2013.01); *B32B 3/00* (2013.01); *B32B 27/00* (2013.01); *F21V 5/005* (2013.01); *G02B 5/0231* (2013.01); *G02B 5/0242* (2013.01); *G02B 5/045* (2013.01); *G02F 1/133606* (2013.01); *G02B 6/0053* (2013.01); *G02F 2001/133607* (2013.01)

(58) Field of Classification Search
None
See application file for complete search history.

(56) References Cited

U.S. PATENT DOCUMENTS

2007/0019131 A1*  1/2007  Choi et al. .............. 349/65
2008/0160255 A1*  7/2008  Hsu ...................... 428/141
(Continued)

FOREIGN PATENT DOCUMENTS

JP   2008-268834      *  6/2008
KR   10-2007-0117159 A    12/2007
(Continued)

*Primary Examiner* — Ashok Patel
(74) *Attorney, Agent, or Firm* — Sughrue Mion, PLLC

(57) ABSTRACT

This invention relates to a complex prism sheet which is configured such that heat-resistant coating layers are formed on both surfaces of a substrate layer, thus preventing wrinkling or curling of the complex prism sheet due to heat generated from a light source, and increasing concealment and electro-optic characteristics, ultimately improving properties of a light crystal display. This complex prism sheet can be usefully applied to television (TV) sets, monitors, notebook personal computers (NBPCs), etc., which are required to have heat resistance, slimness and concealment because of an increasing use of a light emitting diode (LED) light source these days.

9 Claims, 2 Drawing Sheets

(51) Int. Cl.
*B32B 3/00* (2006.01)
*B32B 27/00* (2006.01)
*F21V 8/00* (2006.01)

(56) References Cited

U.S. PATENT DOCUMENTS

2009/0297773 A1* 12/2009 Wang ............................ 428/147
2009/0316269 A1* 12/2009 Kim et al. ..................... 359/599
2011/0026271 A1    2/2011 Doo et al.
2011/0280004 A1   11/2011 Shimada et al.
2013/0039031 A1*  2/2013 Asano et al. ................... 362/19

FOREIGN PATENT DOCUMENTS

| KR | 10-2008-0094989 A | 10/2008 |
| KR | 10-2009-0131816 A | 12/2009 |
| KR | 10-2011-0071000 A | 6/2011 |

* cited by examiner

COMPLEX PRISM SHEET

CROSS REFERENCE TO RELATED APPLICATIONS

This application is a National Stage of International Application No. PCT/KR2012/010541 filed Dec. 6, 2012, claiming priority based on Korean Patent Application Nos. 10-2011-0147910, filed Dec. 30, 2011 and 10-2012-0130672, filed Nov. 19, 2012, the contents of all of which are incorporated herein by reference in their entirety.

TECHNICAL FIELD

The present invention relates to a complex prism sheet, and more particularly to a complex prism sheet suitable for use in a liquid crystal display.

BACKGROUND ART

A backlight unit (BLU) which is a light emitting element widely used in a liquid crystal display (LCD) allows light emitted using a light source such as a cold cathode fluorescent lamp (CCFL), etc., to sequentially pass through a light guide plate, a diffusion sheet and a prism sheet to reach a liquid crystal panel.

The light guide plate transfers light such that light emitted from the light source is distributed onto the entire surface of the liquid crystal panel which is planar, the diffusion sheet makes light intensity uniform over the entire surface of the screen, and the prism sheet performs a light passage control function such that light rays that have passed through the diffusion sheet in a variety of directions are converted into an image within a range of a viewing angle adapted to be observed by a user. Also, a reflective plate is provided under the light guide plate such that light falling out of the light passage without being transferred to the liquid crystal panel is reflected again so as to be used, thereby increasing use efficiency of the light source.

In such a backlight unit, the prism sheet performs a light collection function, and controls the passage of light diffused in a variety of directions through the diffusion sheet so as to increase front luminance of the display, thus achieving a brighter and clearer image.

Recently, as displays are being made slimmer, a complex prism sheet is being developed, which is able to achieve both a diffusion function and a light collection function by introducing a light diffusion layer to the prism sheet. Furthermore, in order to reduce the cost of the display, the number of light sources is decreased in the backlight unit.

However, because the output of individual light sources should be increased to decrease the number of light sources in the backlight unit, variations (a portion distant away from a portion adjacent to the light source in the complex prism sheet) of heat transferred to the complex prism sheet should increase due to increased output of the light source. The variations of heat cause a difference in shrinkage and expansion at different positions of the complex prism sheet, and thus the complex prism sheet may wrinkle or curl due to the difference in shrinkage and expansion at different positions of the complex prism sheet.

When the complex prism sheet wrinkles or curls in this way, uniformity of light incident on the liquid crystal panel may decrease, undesirably deteriorating the quality of an image. That is, curling or wrinkling of the complex prism sheet expanded or shrunken due to variations of heat generated from the light source makes it difficult to efficiently introduce light to the liquid crystal panel from the light source. Thus, the development of techniques for solving this problem is required.

DISCLOSURE

Technical Problem

An object of the present invention is to provide a complex prism sheet, which may be prevented from unintended wrinkling or curling, and a backlight unit including the same and a liquid crystal display.

Technical Solution

In order to accomplish the above object, a preferred embodiment of the present invention provides a complex prism sheet, comprising a substrate layer, a first heat-resistant coating layer formed on a lower surface of the substrate layer, a second heat-resistant coating layer formed on an upper surface of the substrate layer and containing light-diffusing particles, and a prism layer formed on an upper surface of the second heat-resistant coating layer.

In this embodiment, the first heat-resistant coating layer may be formed of a urethane acrylate resin having a glass transition temperature of 80° C. or more.

In this embodiment, the second heat-resistant coating layer may comprise a urethane acrylate resin and light-diffusing particles, and the light-diffusing particles may be used in an amount of 0.5~300 parts by weight based on 100 parts by weight of the urethane acrylate resin.

In this embodiment, the second heat-resistant coating layer may be formed of a urethane acrylate resin having a glass transition temperature of 80° C. or more.

In this embodiment, the light-diffusing particles may be monodispersed or bidispersed in the urethane acrylate resin.

In this embodiment, the light-diffusing particles may be contained as a monolayer in the urethane acrylate resin.

In this embodiment, the light-diffusing particles may have an average particle size of 1~20 μm.

In this embodiment, the first heat-resistant coating layer may have a thickness of 0.2~5 μm, and the second heat-resistant coating layer may have a thickness of 1~20 μm.

In this embodiment, the prism layer may have any one selected from the group consisting of a linear array structure of parallel triangular prisms, a polypyramidal prism structure, a conical prism structure, a hemispherical prism structure and a non-spherical prism structure.

Another preferred embodiment of the present invention provides a backlight unit, comprising the above complex prism sheet.

Still another preferred embodiment of the present invention provides a liquid crystal display, comprising the above backlight unit.

Advantageous Effects

According to the present invention, a complex prism sheet is configured such that heat-resistant coating layers are formed on both surfaces of a substrate layer, thus preventing wrinkling or curling of the complex prism sheet due to heat generated from a light source, and increasing concealment and electro-optic characteristics, thereby obtaining further improved properties of a liquid crystal display. Recently, because the use of a light emitting diode (LED) light source is increasingly common, this complex prism sheet can be usefully applied to television (TV) sets, monitors, notebook personal computers (NBPCs), etc., which are required to have heat resistance, slimness and concealment.

BEST MODE

Hereinafter, a detailed description will be given of the present invention.

Figure 1:
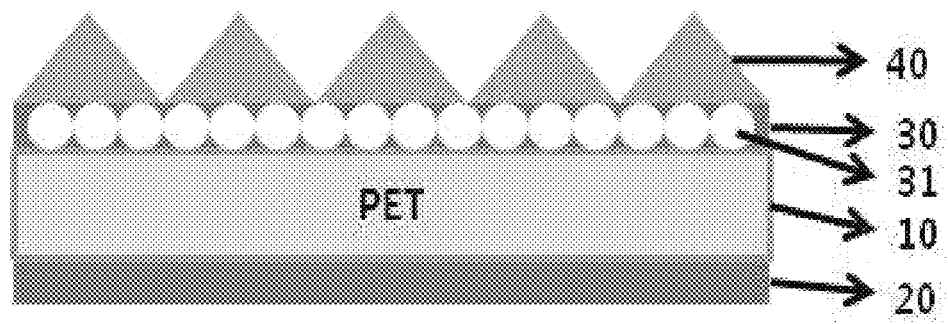
FIG. 1 is a cross-sectional view illustrating a complex prism sheet according to an embodiment of the present invention.

According to an embodiment of the present invention, a complex prism sheet includes a substrate layer 10; a first heat-resistant coating layer 20 formed on the lower surface of the substrate layer 10; a second heat-resistant coating layer 30 formed on the upper surface of the substrate layer 10 and containing light-diffusing particles 31; and a prism layer 40 formed on the upper surface of the second heat-resistant coating layer 30 (FIG. 1).

More particularly, the complex prism sheet according to the present invention is configured such that the first and second heat-resistant coating layers are provided on both surfaces of the substrate layer 10 so as to prevent wrinkling or curling as in a conventional complex prism sheet. The complex prism sheet of the invention includes a substrate layer 10, a first heat-resistant coating layer 20, a second heat-resistant coating layer 30 and a prism layer 40.

Respective constituents of the complex prism sheet according to the present invention are specified below.

<Substrate Layer 10>

According to the present invention, the substrate layer 10 may be made of any material which may be used without limitation so long as it is a material for a substrate layer usable in a backlight unit, and examples thereof include a transparent substrate layer such as a polyethylene terephthalate film, a polycarbonate film, a polypropylene film, a polyethylene film, a polyepoxy film, etc. Preferably useful are a polyethylene terephthalate film and a polycarbonate film.

Furthermore, the thickness of the substrate layer is 10~1000 μm, and preferably 15~400 μm. If the thickness of the substrate layer is less than 10 μm, mechanical strength and thermal stability may deteriorate. In contrast, if the thickness thereof exceeds 1000 μm, flexibility of the film may decrease and the transmitted light may be lost.

<First Heat-Resistant Coating Layer 20>

According to the present invention, the first heat-resistant coating layer 20 is formed on the lower surface of the substrate layer 10, and has high heat resistance so that the substrate layer 10 is prevented from being deformed due to heat generated from the light source and transfer of heat is blocked, thereby preventing the deformation of the second heat-resistant coating layer 30 and the prism layer 40.

The first heat-resistant coating layer 20 may be made of any urethane acrylate which may be used without limitation so long as it has high heat resistance. Preferably, a urethane acrylate resin having a glass transition temperature (Tg) of 80° C. or more, and more preferably a Tg of 90~150° C. As such, Tg was measured from −30° C. to 300° C. by heating a sample at a rate of 10° C./min using DSC (Differential Scanning calorimetry, DSC 8000 available from PerkinElmer) according to ASTM E1356.

If a urethane acrylate resin having a Tg of less than 80° C. is used, heat resistance of the urethane acrylate resin may decrease, and undesirably the effect of use of urethane acrylate resin may become insignificant.

Preferred examples of the urethane acrylate resin having heat resistance may include a polyol, an isocyanate and a fluorine-based acrylate.

The polyol may be one or more selected from among polycarbonate, polycaprolactone, polyester, butanediol and pentaerythritol, in order to increase hardness of the first heat-resistant coating layer, and the isocyanate may be one or more selected from among toluene 2,4-diisocyanate, diphenyl diisocyanate, hexamethylene diisocyanate, tetramethylxylene diisocyanate and hexamethylene diisocyanate, in order to increase hardness of the first heat-resistant coating layer. As such, the equivalent ratio of the isocyanate group (NCO) of the isocyanate relative to the hydroxyl group (OH) of the polyol may be set to 0.95~1.10. If the equivalent ratio of the isocyanate group (NCO) relative to the hydroxyl group (OH) is less than 0.95, hardness of the coating layer may decrease due to an unreacted hydroxyl group. In contrast, if the equivalent ratio of the isocyanate group (NCO) is greater than 1.10, water resistance may decrease due to an unreacted isocyanate.

The fluorine-based acrylate may be one or more selected from among tetrafluoropropyl acrylate, tetrafluoroethyl methacrylate and trifluoroethyl methacrylate, each of which has high heat resistance. The fluorine-based acrylate may be added in an amount of 10~100 parts by weight based on 100 parts by weight of the polyol. If the amount of the fluorine-based acrylate is less than 10 parts by weight based on 100 parts by weight of the polyol, heat resistance may decrease. In contrast, if the amount thereof exceeds 100 parts by weight, luminance may decrease due to low refractive index.

In order to form the first heat-resistant coating layer, any method may be used without limitation so long as a urethane acrylate resin is applied on the substrate layer, and examples of the method may include gravure coating, roll coating, spin coating, spraying, dip coating, wire bar coating, etc.

The first heat-resistant coating layer formed on the lower surface of the substrate layer may have a thickness of 0.2~5 μm. If the thickness of the first heat-resistant coating layer is less than 0.2 μm, surface hardness may decrease, undesirably creating scratching. In contrast, if the thickness thereof exceeds 5 μm, curling may be caused.

<Second Heat-Resistant Coating Layer 30>

According to the present invention, the second heat-resistant coating layer 30 is formed on the upper surface of the substrate layer 10, and has high heat resistance so as to prevent deformation of the substrate layer 10 due to heat generated from the light source and to block transfer of heat, thus preventing deformation of the prism layer.

The second heat-resistant coating layer is obtained by adding light-diffusing particles 31 to the urethane acrylate resin of the first heat-resistant coating layer mentioned above, and may include a urethane acrylate resin which is the same as or different from the urethane acrylate resin used in the first heat-resistant coating layer.

The urethane acrylate resin usable in the second heat-resistant coating layer preferably includes a heat-resistant urethane acrylate resin which has good adhesion to the substrate layer 10 and the prism layer 40 and high compatibility with the light-diffusing particles 31 dispersed therein, that is, a heat-resistant urethane acrylate resin in which light-diffusing particles are uniformly dispersed and thus separation or precipitation thereof does not occur well.

The light-diffusing particles 31 may include a plurality of organic particles or inorganic particles. Typical examples of the organic particles may include acryl particles, including homopolymers or copolymers of methyl methacrylate, acrylic acid, methacrylic acid, hydroxyethyl methacrylate, hydroxypropyl methacrylate, acrylamide, methylol acrylamide, glycidyl methacrylate, ethyl acrylate, isobutyl acrylate, n-butyl acrylate, 2-ethylhexyl acrylate; olefin particles such as polyethylene, polystyrene, polypropylene, etc.; acryl-olefin copolymer particles; and multilayer multicomponent particles prepared by forming a layer of homopolymer particles and then forming a layer of another type of monomer thereon, siloxan-based polymer particles, and tetrafluoroethylene-based particles. Examples of the inorganic particles may include silicone, silicon oxide, aluminum oxide, titanium oxide, zirconium oxide, and magnesium fluoride. The above-mentioned organic and inorganic particles are merely illustrative, and are not limited to the examples listed above, and may be replaced with other known materials so long as the main purpose of the present invention is achieved, as will be apparent to those skilled in the art, and the case in which the type of material is changed also falls within the scope of the present invention.

The light-diffusing particles 31 may be used in an amount of 0.5~300 parts by weight, and preferably 50~250 parts by weight, based on 100 parts by weight of the urethane acrylate resin. If the amount of the light-diffusing particles is less than 0.5 parts by weight, the space occupied by the light-diffusing particles in the entire area, that is, the fill factor, may decrease, undesirably lowering luminance and concealment. In contrast, if the amount thereof exceeds 300 parts by weight, the monolayer coating of light-diffusing particles is impossible, undesirably decreasing luminance.

The light-diffusing particles may be provided in the form of a monolayer coating on the upper surface of the substrate layer by monodispersing or bidispersing them in the urethane acrylate resin. As such, monodispersing means that particles having a deviation of particle size of less than 10% are dispersed, and bidispersing means that particles having a deviation of particle size of 10~30% are dispersed. If the light-diffusing particles are dispersed in the urethane acrylate resin under conditions of the deviation of particle size exceeding 30% or are applied in the form of a multilayer on the upper surface of the substrate layer, luminance may undesirably decrease.

The monodispersed or bidispersed light-diffusing particles may be provided in the form of a monolayer coating, thus increasing the electro-optic characteristics of the complex prism sheet, and also, the light-diffusing particles are contained in the second heat-resistant coating layer between the substrate layer and the prism layer, thus appropriately improving concealment of the complex prism sheet.

The light-diffusing particles may have an average particle size of 1~20 µm, and preferably 10~15 µm. If the average particle size of the light-diffusing particles is less than 1 µm, the second heat-resistant coating layer may become thin, undesirably decreasing heat resistance. In contrast, if the thickness thereof exceeds 20 µm, the second heat-resistant coating layer may become thick, undesirably decreasing luminance.

In order to form the second heat-resistant coating layer, any method may be used without limitation so long as a resin is applied on the substrate layer, and examples of the method may include gravure coating, roll coating, spin coating, spraying, dip coating, wire bar coating, etc.

The second heat-resistant coating layer formed on the upper surface of the substrate layer may have a thickness of 1~20 µm. If the thickness of the first heat-resistant coating layer is less than 1 µm, the coating layer is thin, undesirably decreasing heat resistance. In contrast, if the thickness thereof exceeds 20 µm, the coating layer is thick, undesirably decreasing luminance or creating curling.

<Prism Layer 40>

According to the present invention, the prism layer 40 may be formed on the upper surface of the second heat-resistant coating layer 30, and the prism structure of the prism layer may be any one selected from among a linear array structure of parallel triangular prisms, a polypyramidal prism structure, a conical prism structure, a hemispherical prism structure, and a non-spherical prism structure. As illustrated in FIG. 1, in the case where the structure of the prism layer is in the form of a linear array of triangular prisms, optical characteristics such as front luminance and light intensity distribution within a viewing angle may vary considerably depending on the apex angles of the prism structure. The apex angle of the prism structure is preferably set to 80~100°. If this angle is less than 80°, front luminance by light collection is good but light intensity distribution within a viewing angle becomes poor. In contrast, if this angle is greater than 100°, light intensity distribution within a viewing angle is good but front luminance may decrease.

The material for the prism layer may include a polymer resin including a UV curable resin or a heat curable resin. Particularly useful is a resin composition that is very transparent and is capable of forming a crosslink bond adequate for maintaining the shape of an optical structure. Examples thereof include epoxy resin-Lewis acid or polyethylol, unsaturated polyester-styrene, and acrylic or methacrylic acid ester. Particularly useful as a very transparent resin is an acrylic or methacrylic acid ester resin, examples of which include oligomers, including polyurethane acrylate or methacrylate, epoxy acrylate or methacrylate, and polyester acrylate or methacrylate, which may be used alone or diluted with an acrylate or methacrylate monomer having a multifunctional or monofunctional group.

As mentioned above, the complex prism sheet is configured such that the first and second heat-resistant coating layers are formed on both surfaces of the substrate layer, thus preventing the wrinkling or curling, which is a problem of a conventional complex prism sheet.

In addition, the present invention is directed to a backlight unit including the above complex prism sheet, and to a liquid crystal display including the backlight unit. The backlight unit and the liquid crystal display including the backlight unit may be manufactured using methods which are widely known in the art to which the present invention belongs, and a detailed description thereof is omitted.

The present invention may provide a backlight unit and a liquid crystal display, formed by additionally providing an optical sheet, a light diffusion sheet or a protective sheet adjacent to any one surface of the complex prism sheet as mentioned above. Thereby, a light diffusion member and an optical sheet are not separately layered but may be provided together, so that a backlight unit and a liquid crystal display able to increase concealment and prevent luminance from decreasing may be provided.

A better understanding of the present invention may be obtained through the following examples, which are set forth to illustrate but not to be construed to limit the present invention.

Examples 1 to 5

A complex prism sheet was manufactured via the following method using resins and light-diffusing particles shown in Table 1 below.

A urethane acrylate resin (EFT, KOLON) having a Tg of 120° C. was applied on the lower surface of a transparent polyethylene terephthalate film (KOLON) having a thickness of 250 μm using a gravure coater, dried at 120° C. for 60 sec, and cured using a UV curing machine for 3 sec, thus forming a first heat-resistant coating layer having a thickness of 3 μm. Subsequently, a urethane acrylate resin (EFT, KOLON) having a Tg of 120° C. was mixed with light-diffusing particles (polymethyl methacrylate (PMMA) and silicone) and dispersed using a milling machine. The urethane acrylate resin having light-diffusing particles dispersed therein was applied on the upper surface of the polyethylene terephthalate film (KOLON) using a gravure coater, dried at 120° C. for 60 sec, and cured using a UV curing machine for 3 sec, thus forming a second heat-resistant coating layer having a thickness of 5 μm.

Also, a prism layer was formed in such a manner that a photosensitive composition comprising 80 wt % of a high refractive acrylate, 15 wt % of 2-phenylethyl methacrylate, 3 wt % of 1,6-hexanediol acrylate, and 2 wt % of a bisacylphosphine (BAPO)-based photoinitiator was applied, and irradiated with UV light (300 Watt/inch$^2$, FUSION) toward the second heat-resistant coating layer, thus forming linear triangular prisms in which the apex angle of the prism was 90°, the pitch of the prism optical structure was 50 μm and the height of the prism optical structure was 25 μm, thereby manufacturing a complex prism sheet.

Comparative Examples 1 to 7

A complex prism sheet was manufactured in the same manner as in Example 1, with the exception that resins and light-diffusing particles shown in Table 1 were used.

Comparative Example 8

A complex prism sheet was manufactured in the same manner as in Example 1, with the exception that 50 parts by weight of light-diffusing particles were dispersed in 100 parts by weight of a urethane acrylate resin (EFT, KOLON) thus forming a first heat-resistant coating layer and light-diffusing particles of a second heat-resistant coating layer were applied in the form of a multilayer thus forming a second heat-resistant coating layer.

TABLE 1

| | First coating layer | | Second coating layer | | | | | | |
|---|---|---|---|---|---|---|---|---|---|
| | | | Heat-resistant layer | Resin | | light-diffusing particles | | | |
| | Heat-resistant layer | Resin | | Material | Amount (wt parts) | Particle size | Type of dispersion | Material | Amount (wt parts) | Type of coating |
| Ex. 1 | Heat resist. | EFT (KOLON) | Heat resist. | EFT (KOLON) | 100 | 10 μm | mono-dispersed | PMMA | 250 | mono-layer |
| Ex. 2 | Heat resist. | EFT (KOLON) | Heat resist. | EFT (KOLON) | 100 | 15 μm | mono-dispersed | PMMA | 250 | mono-layer |
| Ex. 3 | Heat resist. | EFT (KOLON) | Heat resist. | EFT (KOLON) | 100 | 10 μm | mono-dispersed | Silicon | 200 | mono-layer |
| Ex. 4 | Heat resist. | EFT (KOLON) | Heat resist. | EFT (KOLON) | 100 | 10 μm | bi-dispersed | PMMA | 250 | mono-layer |
| Ex. 5 | Heat resist. | EFT (KOLON) | Heat resist. | EFT (KOLON) | 100 | 15 μm | bi-dispersed | Silicone | 200 | mono-layer |
| C. Ex. 1 | Heat resist. | EFT (KOLON) | Heat resist. | EFT (KOLON) | 100 | 10 μm | mono-dispersed | PMMA | 2250 | multi-layer |
| C. Ex. 2 | Heat resist. | EFT (KOLON) | Heat resist. | EFT (KOLON) | 100 | 10 μm | mono-dispersed | Silicon | 200 | multi-layer |
| C. Ex. 3 | Heat resist. | EFT (KOLON) | Heat resist. | EFT (KOLON) | 100 | 10 μm | multi-dispersed | PMMA | 250 | mono-layer |
| C. Ex. 4 | Heat resist. | EFT (KOLON) | Heat resist. | EFT (KOLON) | 100 | 15 μm | multi-dispersed | PMMA | 250 | mono-layer |
| C. Ex. 5 | Heat resist. | EFT (KOLON) | General | Natoco | 100 | 10 μm | mono-dispersed | PMMA | 250 | mono-layer |
| C. Ex. 6 | General | Natoco | Heat resist. | EFT (KOLON) | 100 | 10 μm | mono-dispersed | PMMA | 250 | mono-layer |
| C. Ex. 7 | General | Natoco | General | Natoco | 100 | 10 μm | mono-dispersed | PMMA | 250 | mono-layer |
| C. Ex. 8 | Heat resist. | EFT (KOLON) (with 50 wt parts of light-diffusing particles) | Heat resistance | EFT (KOLON) | 100 | 10 μm | mono-dispersed | PMMA | 250 | mono-layer |

Note)
EFT (KOLON): urethane acrylate resin having Tg of 120° C.
Natoco (NATOCO): urethane acrylate resin having Tg of 70° C.

The relative luminance, curling, and concealment of the complex prism sheets of the examples and comparative examples were measured as follows. The results are shown in Table 2 below.

<Measurement of Relative Luminance>

Two complex prism sheet samples of the examples and comparative examples were layered perpendicular to each other and fixed to a backlight unit (LM170E01, available from Heesung Electronics Co. Ltd., Korea) for a 17" LCD panel, and the luminance values of 13 random positions were measured using a luminance meter (BM-7A, available from TOPCON, Japan), and averaged.

<Measurement of Curling>

Figure 2:
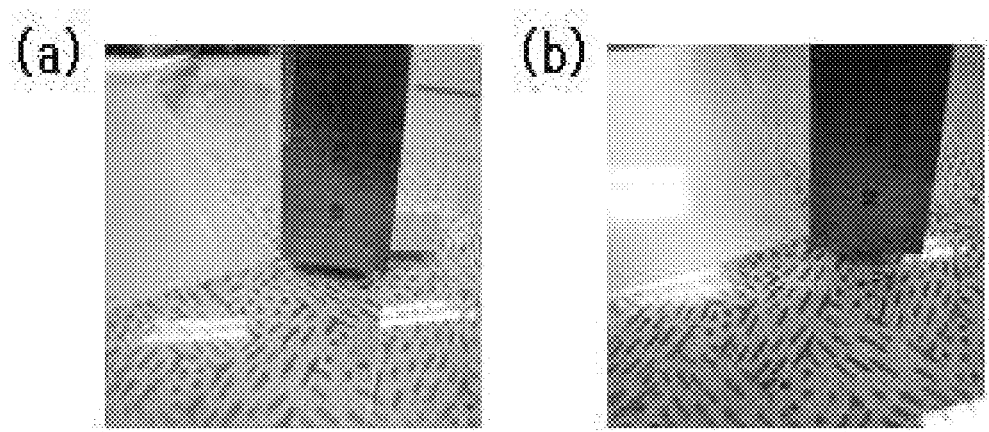
FIGS. 2A and 2B illustrate the measurement of curling of the complex prism sheet of the invention.

The complex prism sheet sample was allowed to stand at 85° C. for 1,000 hr, and the extent that the sheet got loose was then measured. For example, FIG. 2A shows curling of 1 mm and FIG. 2B shows curling of 3 mm.

<Measurement of Concealment>

Figure 3:
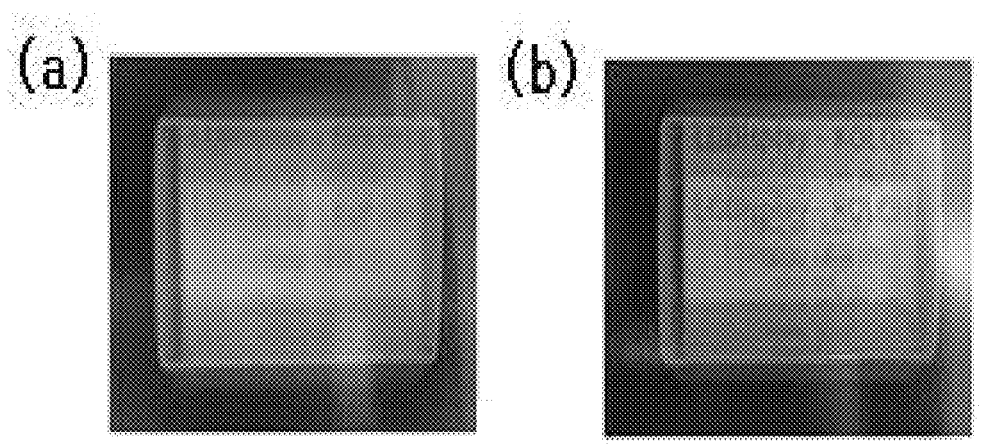
FIGS. 3A and 3B illustrate the measurement of concealment of the complex prism sheet of the invention.

The extent that the a letter is clearly observed with the naked eye on the back surface 2 cm of the complex prism sheet sample was evaluated by levels 1~4. For example, FIG. 3A shows concealment at level 4, and FIG. 3 3B shows concealment at level 2.

Level 1: a letter is clearly observed
Level 2: a letter is observed but its phase is split
Level 3: a letter's phase is split and is difficult to read
Level 4: a letter is not clearly observed and cannot be read

TABLE 2

|  | Relative Luminance | Curling | Concealment |
| --- | --- | --- | --- |
| Ex. 1 | 100.0 | 1 mm | 4 |
| Ex. 2 | 100.2 | 1 mm | 4 |
| Ex. 3 | 100.6 | 1 mm | 4 |
| Ex. 4 | 99.7 | 1 mm | 4 |
| Ex. 5 | 99.9 | 1 mm | 4 |
| C. Ex. 1 | 95.2 | 1 mm | 5 |
| C. Ex. 2 | 96.3 | 1 mm | 5 |
| C. Ex. 3 | 97.4 | 1 mm | 4 |
| C. Ex. 4 | 97.0 | 1 mm | 4 |
| C. Ex. 5 | 100.1 | 3 mm | 4 |
| C. Ex. 6 | 99.7 | 3 mm | 4 |
| C. Ex. 7 | 100.2 | 3 mm | 4 |
| C. Ex. 8 | 92.3 | 1 mm | 2 |

As is apparent from Table 2, in Examples 1 to 5 and Comparative Examples 1 to 4, in the case where the light-diffusing particles of the second heat-resistant coating layer were provided in the form of a monolayer coating by being monodispersed or bidispersed, luminance was increased. Also, in Examples 1 to 5 and Comparative Examples 5 to 7, when both the upper and lower surfaces of the substrate layer were coated with the first and second heat-resistant coating layers, curling properties were superior.

In Examples 1 to 5 and Comparative Example 8, when the light-diffusing particles were applied only to the second heat-resistant coating layer between the substrate layer and the prism layer, concealment were superior compared to when the light-diffusing particles were applied to both the upper and lower surfaces of the substrate layer. However, in Comparative Example 8, concealment was increased but relative luminance was decreased.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A complex prism sheet, comprising:
    a substrate layer;
    a first heat-resistant coating layer formed on a lower surface of the substrate layer;
    a second heat-resistant coating layer formed on an upper surface of the substrate layer; and
    a prism layer formed on an upper surface of the second heat-resistant coating layer,
    wherein the second heat-resistant coating layer comprises a urethane acrylate resin and light-diffusing particles, and the light-diffusing particles are used in an amount of 200-300 parts by weight based on 100 parts by weight of the urethane acrylate resin.

2. The complex prism sheet of claim 1, wherein the first heat-resistant coating layer is formed of a urethane acrylate resin having a glass transition temperature of 80° C. or more.

3. The complex prism sheet of claim 1, wherein the urethane acrylate resin has a glass transition temperature of 80° C. or more.

4. The complex prism sheet of claim 1, wherein the light-diffusing particles are contained as a monolayer in the urethane acrylate resin.

5. The complex prism sheet of claim 1, wherein the light-diffusing particles have an average particle size of 1-20 μm.

6. The complex prism sheet of claim 1, wherein the first heat-resistant coating layer has a thickness of 0.2-5 μm, and the second heat-resistant coating layer has a thickness of 1-20 μm.

7. The complex prism sheet of claim 1, wherein the prism layer has any one prism structure selected from the group consisting of a linear array structure of parallel triangular prisms, a polypyramidal prism structure, a conical prism structure, a hemispherical prism structure and a non-spherical prism structure.

8. A backlight unit, comprising the complex prism sheet of claim 1.

9. A liquid crystal display, comprising the backlight unit of claim 8.

* * * * *